US007894861B2

(12) United States Patent
Grivas et al.

(10) Patent No.: US 7,894,861 B2
(45) Date of Patent: Feb. 22, 2011

(54) METHOD OF ENABLING A REMOTE COMMUNICATIONS DEVICE WITH A TELEMATICS FUNCTIONALITY MODULE

(75) Inventors: Nick J. Grivas, Crystal Lake, IL (US); David P. Peterson, Grayslake, IL (US); James A. Van Bosch, Crystal Lake, IL (US); James Walby, Delavan, WI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 727 days.

(21) Appl. No.: 10/737,234

(22) Filed: Dec. 16, 2003

(65) Prior Publication Data

US 2005/0130723 A1 Jun. 16, 2005

(51) Int. Cl.
*H04M 1/00* (2006.01)
(52) U.S. Cl. ................ 455/569.2; 455/569.1; 455/570; 455/575.9; 455/297
(58) Field of Classification Search ... 455/569.1–569.2, 455/557, 420, 575.9, 556.1, 563, 570, 474.9
See application file for complete search history.

(56) References Cited

U.S. PATENT DOCUMENTS

| 5,790,652 | A | | 8/1998 | Gulley et al. | |
|---|---|---|---|---|---|
| 5,859,628 | A | * | 1/1999 | Ross et al. | 345/173 |
| 5,917,905 | A | | 6/1999 | Whipple et al. | |
| 6,262,655 | B1 | * | 7/2001 | Yoshioka et al. | 340/425.5 |
| 6,263,216 | B1 | * | 7/2001 | Seydoux et al. | 455/564 |
| 6,751,475 | B1 | * | 6/2004 | Holmes et al. | 455/557 |
| 2001/0055165 | A1 | * | 12/2001 | McCarthy et al. | 359/839 |
| 2002/0032042 | A1 | * | 3/2002 | Poplawsky et al. | 455/564 |
| 2002/0083000 | A1 | * | 6/2002 | Kawai | 705/51 |
| 2002/0094829 | A1 | * | 7/2002 | Ritter | 455/517 |
| 2003/0096641 | A1 | * | 5/2003 | Odinak | 455/569 |
| 2003/0231550 | A1 | * | 12/2003 | Macfarlane | 367/198 |
| 2004/0227523 | A1 | * | 11/2004 | Namaky | 324/537 |

FOREIGN PATENT DOCUMENTS

WO WO 98/54845 * 12/1998

* cited by examiner

*Primary Examiner*—Dai A Phuong

(57) ABSTRACT

Method of enabling a remote communications device (106) with a telematics functionality module (150) can include providing a docking apparatus (114) coupled to interface with a vehicle (109). The remote communications device is communicatively coupled to the docking apparatus, wherein the remote communications device is non-enabled with a telematics functionality module (150). The docking apparatus and the remote communications device enable the remote communications device with the telematics functionality module.

26 Claims, 5 Drawing Sheets

METHOD OF ENABLING A REMOTE COMMUNICATIONS DEVICE WITH A TELEMATICS FUNCTIONALITY MODULE

BACKGROUND OF THE INVENTION

One of the fastest growing markets for providing wireless services is known as "telematics" and entails delivering a wide spectrum of information via wireless links to vehicle-based subscribers. Prior art telematics devices can have a separate cellular phone portion that is detachable from the in-car portion. Also, prior art car kits, whether they are OEM or after-market, are designed to interface with a phone portion. These phone portions are designed to interface specifically with the in-car portion or the car kit, where standard cellular phones do not have the necessary capabilities to interface with the in-car portion or the car kit. In other words, these special "telematics" phones come pre-packaged with software and hardware such that they interface with a specific vehicle or car kit, where standard cellular phones do not. These prior art telematics devices have the disadvantage that newer cellular phones (absent specific software and hardware targeted toward a specific in-car portion or car kit) are not compatible with the in-car portion or the car kit. Therefore, the new cellular phones are not capable of interfacing with the in-car portion or the car kit to perform telematics related functions.

Accordingly, there is a significant need for a method and apparatus that overcomes the deficiencies of the prior art outlined above.

BRIEF DESCRIPTION OF THE DRAWINGS

Referring to the Drawing.

Figure 1:
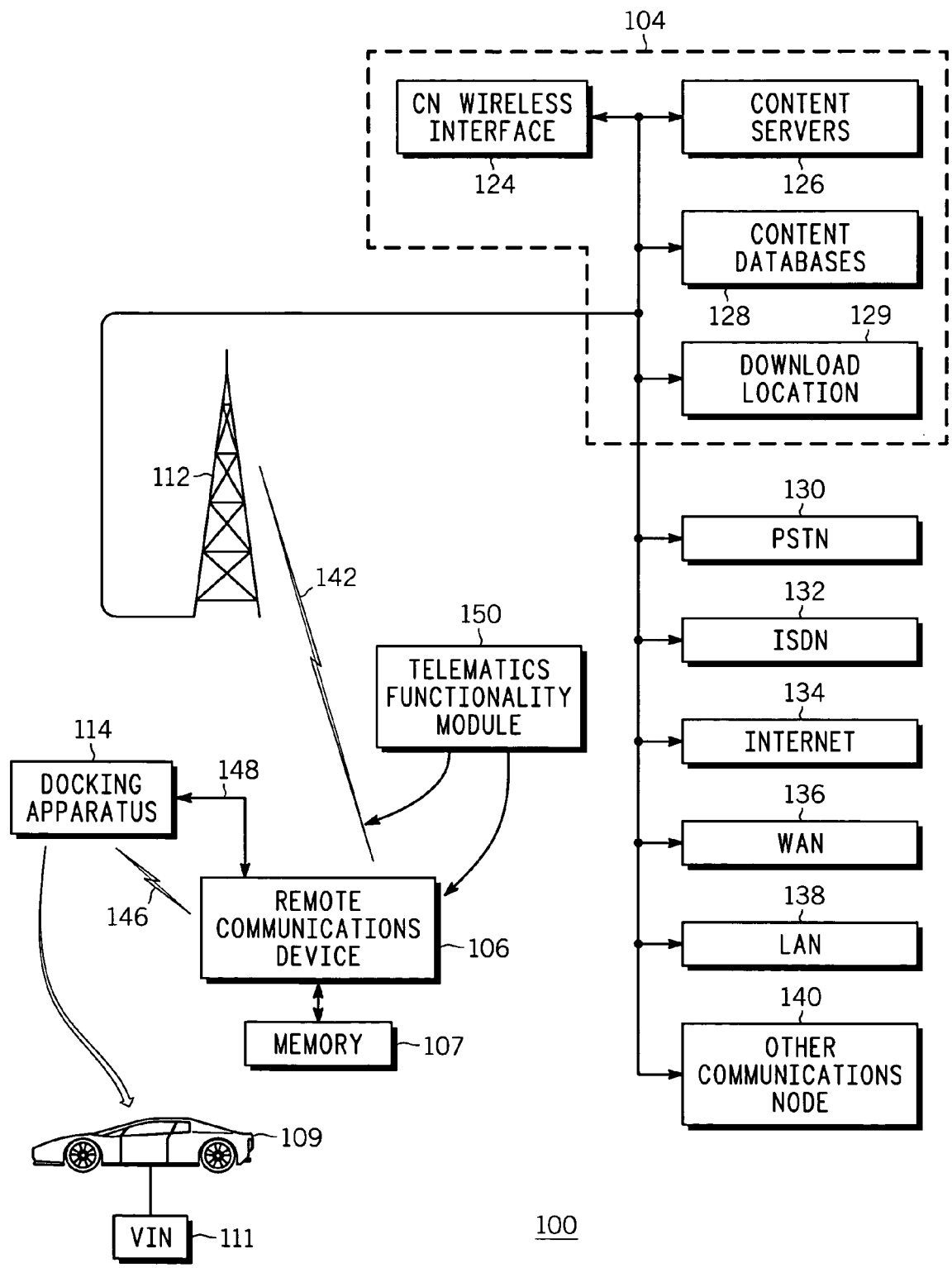
FIG. 1 depicts a communications system according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures, software blocks and techniques have not been shown in detail in order not to obscure the invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact. However, "coupled" may also mean that two or more elements are not in direct contact with each other, but yet still co-operate or interact with each other.

For clarity of explanation, the Figures illustrate embodiments of the present invention, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

The following embodiments can include software blocks that can be computer program modules comprising computer instructions that are stored in a computer-readable medium such as a memory. These software modules are merely representative of one embodiment of the invention. In other embodiments, additional modules could be provided as needed, and/or unneeded modules could be deleted.

FIG. 1 depicts a communications system 100 according to one embodiment of the invention. As shown in FIG. 1, communications system 100 includes communications node 104, a vehicle 109, docking apparatus 114 and a remote communications device 106. Vehicle 109 can include, without limitation, a car, truck, bus, train, aircraft, boat, and the like. Although only one remote communications device 106 and vehicle 109 are shown, the invention can include any number of these elements interoperating with each other. In an embodiment, vehicle 109 can include a vehicle identification number (VIN) 111, which can be the VIN supplied as a unique identification number by the manufacturer of vehicle 109 or a different unique serial number used to identify the vehicle for the purposes of interfacing with docking apparatus 114 and/or remote communications device 106.

Remote communications device 106 can include, without limitation, a wireless unit such as a cellular or Personal Communication System (PCS) telephone, a pager, a hand-held computing device such as a personal digital assistant (PDA) or Web appliance, a personal computer, or any other type of wireless communications and/or computing device. Remote communications device 106 can include, but is not limited to, functional and operative hardware and software modules, input/output (I/O) elements, display, and the like.

Remote communications device 106 can be coupled to vehicle 109 via docking apparatus 114 through a wireless link 146 or wireline link 148. Wireless link 146 can couple remote communications device 106 to docking apparatus 114 utilizing any short-range wireless communications protocols, for example Wireless Personal Area Network (WPAN) communications protocols. Examples of these WPAN communications protocols include, but are not limited to, Bluetooth, Object Exchange Protocol (OBEX), HomeRF, 802.11, Wireless Area Protocol (WAP), Infrared, Dedicated Short Range Communication (DSRC) system, magnetic communications means, and the like. Remote communications device 106 can communicate with communications node 104, for example and without limitation, via communications link 142. In an embodiment, docking apparatus 114 can be a car kit, where car kit can be either an integral part of vehicle 109 or an after-market car kit designed to interface with vehicle 109.

Communications system 100 can include communications node 104, which can be coupled to any number of base stations 112 to provide wireless communication to and from remote communications device 106 via wireless communications link 142. Communications node 104 can be coupled to base station 112 via wireline or wireless communication links. In an embodiment, communications node 104 also can communicate with a satellite.

Communications node 104 can include content servers 126 and content databases 128, which can include a hard drive, floppy disk drive, optical drive, CD-ROM, RAM, ROM, EEPROM, or any other means of storing content, which can be utilized by remote communications device 106. In the embodiment depicted in FIG. 1, content databases 128 can function to store location information, user profiles, traffic content, map content, point-of-interest content, usage history, and the like. However content databases 128 are not limited to these functions, and other database functions are within the scope of the invention.

Communications node 104 can also include a communications node (CN) wireless interface 124, which can comprise one or more network access devices (NAD's) that can utilize a wireless network protocol that can include, without limitation, narrowband and/or broadband connections with standard cellular network protocols such as Global System for Mobile Communications (GSM), Time Division Multiple Access (TDMA), Code Division Multiple Access (CDMA), and the like. In another embodiment, standard transmission control protocol/internet protocol (TCP/IP) can also be used. CN wireless interface 124 can also send and receive content using standard paging networks, FM sub-carriers, satellite networks, and the like. Communications node 104 can be coupled to a public switched telecommunication network (PSTN) 130, an integrated services digital network (ISDN) 132, Internet 134, one or more wide area networks (WAN's), one or more local area networks (LAN's) 138, and any number of other communications nodes 140.

In an embodiment, communications node 104 can also include download location 129, which can be used as a location for remote communications device 106 to download telematics functionality module 150 into memory 107 if telematics functionality module 150 is not already present in remote communications device 106. Telematics functionality module 150 can include applications and functionality pertaining to vehicle 109, examples of which are discussed below. Memory 107 can include, but is not limited to, random access memory (RAM), read only memory (ROM), flash memory, electrically erasable programmable ROM (EEPROM), and the like.

In an embodiment, remote communications device 106 is non-enabled with telematics functionality module 150. In other words, remote communications device 106 does not include any telematics functionality and cannot perform telematics related functions. In an embodiment, in order for remote communications device 106 to be able to perform telematics related functions, it must have telematics functionality module 150 enabled and/or downloaded to memory 107 and enabled.

Docking apparatus 114 can be coupled to vehicle 109 so as to interface with vehicle 109. In an embodiment, communicatively coupling remote communications device 106 to docking apparatus 114 can enable remote communications device 106 with telematics functionality module 150. Docking apparatus 114 can include a memory, processor, and the like analogous to that found in remote communications device 106. Communicatively coupling remote communications device 106 to docking apparatus can occur through one or more of wireless link 146 and/or wireline link 148.

In one embodiment, remote communications device 106 can detect the presence of docking apparatus 114 and remote communications device 106 can initiate communicative coupling to docking apparatus 114. In this embodiment, remote communications device 106 initiates communication and permits the downloading and/or enabling of telematics functionality module 150 once communication is established with docking apparatus 114. Once communicatively coupled, remote communications device 106 and docking apparatus 114 can exchange capability data (not shown for clarity). Capability data can include, but is not limited to, software configuration, hardware configuration, identification data, security data, and the like, of each of docking apparatus 114 and remote communications device 106. By exchanging capability data with each other, both docking apparatus 114 and remote communications device 106 are then aware of each others capabilities as far as hardware (processor, memory, input device, display, and the like), software (version, level of sophistication, compatibilities, capabilities, and the like). Also, docking apparatus 114 and remote communications device 106 can verify each others identity via identity data and security data to ensure both devices are permitted to communicatively couple.

In another embodiment, docking apparatus 114 can detect the presence of remote communications device 106 and docking apparatus 114 can initiate communicatively coupling to remote communications device 106. In this embodiment, docking apparatus 114 initiates communication and permits the downloading and/or enabling of telematics functionality module 150 to remote communications device 106 once communication is established with remote communications device 106. Compatibility data can then be exchanged as described above.

In one embodiment, enabling remote communications device 106 with telematics functionality module 150 can comprise rewriting at least a portion of memory 107 of remote communications device 106 to include telematics functionality module 150. In one embodiment, docking apparatus 114 can already contain telematics functionality module 150 configured to operate with the particular vehicle 109 and remote communications device 106. In this embodiment, it is not necessary to download telematics functionality module 150 from download location 129. In this instance, docking apparatus 114 can, for example and without limitation, reflash some or all of the memory 107 of remote communications device 106 such that telematics functionality module 150 is included in memory 107. If all of memory 107 is rewritten (for example reflashed), docking apparatus 114 can rewrite the functionality, applications and user information of remote communications device 106 to include telematics functionality module 150. This requires that docking apparatus 114 either already have or have previously downloaded the functionality, applications and user information for the particular remote communications device 106 prior to rewriting the memory 107 of remote communications device 106. In this embodiment, the core software of remote communications device 106 is rewritten while reinstating any user information and including telematics functionality module 150.

In another embodiment, docking apparatus 114 can write only a portion of memory 107 of remote communications device 106. For example, docking apparatus 114 can rewrite only a code group within the core code of memory 107. This would allow the call processing and boot loader to remain unmodified, but still allow access to an application group of core code to allow the addition of telematics functionality module 150.

In still another embodiment, when remote communications device 106 is communicatively coupled to docking apparatus 114, docking apparatus 114 can download telematics functionality module 150 into memory 107. Telematics functionality module 150 can be downloaded from download location 129 or docking apparatus 114. When remote communications device 106 is no longer communicatively coupled to docking apparatus 114, telematics functionality module 150 can be removed from memory 107 such that telematics functionality module 150 is no longer available to remote communications device 106. For example, when communicatively coupled, docking apparatus 114 can load telematics functionality module 150 in RAM in memory 107, and when no longer communicatively coupled, telematics functionality module 150 can be erased from RAM in memory 107.

In yet another embodiment, when remote communications device 106 is communicatively coupled to docking apparatus 114, remote communications device 106 can be enabled to download telematics functionality module 150. In this embodiment, remote communications device 106 does not have telematics functionality module 150 in memory. As an example of an embodiment, docking apparatus 114 can communicate a VIN 111 or other unique identification number to remote communications device 106 such that a telematics functionality module 150 compatible with vehicle 109 and remote communications device 106 can be downloaded. In other words, docking apparatus 114 can associate a VIN 111 or other unique identification number to remote communications device 106 such that telematics functionality module 150 is compatible with both vehicle 109 and remote communications device 106.

In yet still another embodiment, when remote communications device 106 becomes communicatively coupled to docking apparatus 114, docking apparatus 114 can query remote communications device 106 for the presence of telematics functionality module 150. If remote communications device 106 does not include a telematics functionality module 150 or does not include a telematics functionality module 150 that is compatible with vehicle 109, then docking apparatus 114 can supply remote communications device 106 with a download location 129 to obtain telematics functionality module 150. As an example of an embodiment, docking apparatus 114 can supply a download location in the form of a URL or phone number to remote communications device 106 so that a telematics functionality module 150 specific to vehicle can be downloaded to remote communications device 106. Docking apparatus 114 can associate VIN 111 or other unique identification number to remote communications device 106 for vehicle specific applications. In an embodiment, remote communications device 106 can be Java™ or Brew (Binary Runtime Environment for Wireless) enabled.

In another embodiment, remote communications device 106 can already have telematics functionality module 150 installed but disabled. When remote communications device 106 is communicatively coupled to docking apparatus 114, docking apparatus 114 can enable the dormant telematics functionality module 150. An example of this embodiment, without limitation, is changing a "bit" or "byte" in memory, such as EEPROM from a "0" to a "1" or visa versa. A specific example of this is docking apparatus 114 flipping a flex bit to enable any one or all of the features of telematics functionality module 150.

Figure 2:
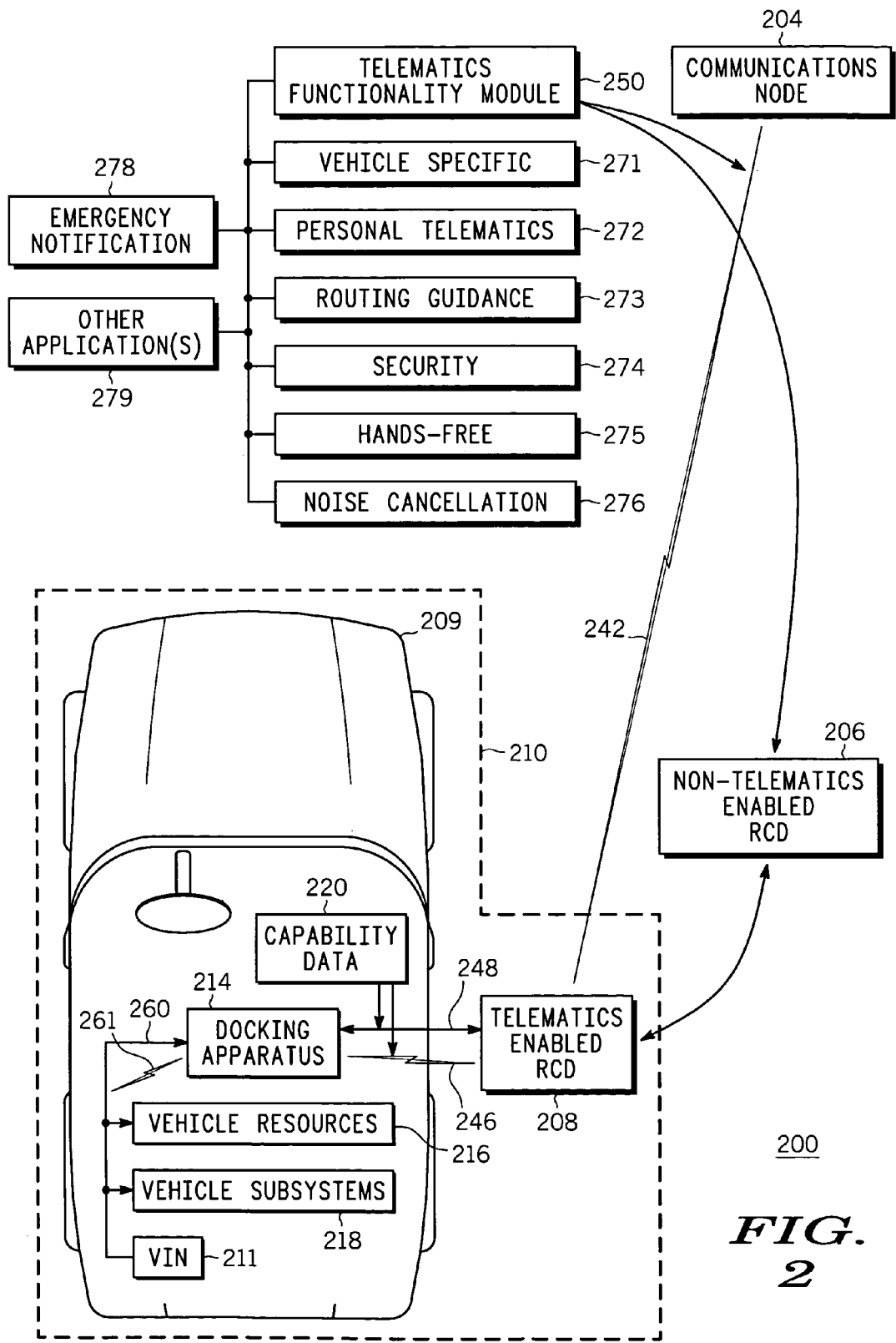
FIG. 2 depicts a communications system according to another embodiment of the invention.

FIG. 2 depicts a communications system 200 according to another embodiment of the invention. As shown in FIG. 2, communications system 200 includes communications node 204, a vehicle 209, docking apparatus 214 and a non-telematics enabled remote communications device (RCD) 206 that can be transformed into a telematics enabled remote communications device (RCD) 208. Although only one telematics enabled remote communications device 208 and vehicle 209 are shown, the invention can include any number of these elements interoperating with each other. In an embodiment, vehicle 209 can include a vehicle identification number (VIN) 211, which can be the VIN supplied as a unique identification number by the manufacturer of vehicle 209 or a different unique serial number used to identify the vehicle for the purposes of interfacing with docking apparatus 214 and/or telematics enabled remote communications device 206.

Non-telematics enabled remote communications device 206 can be transformed to telematics enabled remote communications device 208 by coupling to docking apparatus 214 through wireless link 246 or wireline link 248. Both non-telematics enabled remote communications device 206 and telematics enabled remote communications device 208 can communicate with communications node 204, for example and without limitation, via communications link 242. In an embodiment, communications node 204 can have the same features as the communications node 104 in FIG. 1. In an embodiment, docking apparatus 214 can be a car kit, where car kit can be either an integral part of vehicle 209 or an after-market car kit designed to interface with vehicle 209.

In an embodiment, docking apparatus 214 can be coupled to, and allow telematics enabled remote communications device 208 to communicate with, exchange data with and utilize one or more vehicle resources 216 and one or more vehicle subsystems 218. Docking apparatus can be coupled to vehicle 209 via wireless means 261 or wireline means 260. Communicating can include, without limitation, accessing, operating, configuring, controlling, streaming media to and from, voice communication, downloading or uploading software, communicating status, and the like. Vehicle resource 216 can include, for example and without limitation, vehicle power system, antenna(s), memory, and the like. Vehicle subsystem 218 can include, for example and without limitation, ignition system, door-locking system, comfort features such as seat and mirror adjustments, climate control, automatic distress system, security system, vehicle bus systems such as CAN bus, and the like, positioning system(s), air bag system, and the like. Docking apparatus 214 also allows telematics enabled remote communications device 208 to access the status of any of vehicle resources 216 and vehicle subsystems 218, for example, security status, engine status, internal climate status, occupancy detection system, car start detection system, change in vehicle position (delta-GPS) system, and the like. In one embodiment, docking apparatus 214 allows telematics enabled remote communications device 208 to exchange data with including access, operate, control and configure any of the vehicle subsystems 218. As an example of an embodiment, when an air bag is deployed, a signal can notify remote communications device 208, which in turn notifies an emergency call center such as Public Safety Answering Point (PSAP), and the like.

In an embodiment, non-telematics enabled remote communications device 206 is non-enabled with telematics functionality module 250. In other words, non-telematics enabled remote communications device 206 does not include any telematics functionality and cannot perform telematics related functions. In an embodiment, in order for non-telematics enabled remote communications device 206 to be able to perform telematics related functions, it must have telematics functionality module 250 enabled and/or downloaded to memory (not shown) and enabled.

Telematics functionality module 250 enables telematics functionality and can comprise an extremely wide variety of informational, safety, query, communications, entertainment, and other applications. For example, and without limitation, telematics functionality module 250 can provide vehicle specific applications 271 such as door unlocking, remote access and start, car status data such as oil pressure and temperature, and the like. Telematics functionality module 250 can also include personal telematics applications 272, for example, a user profile for a particular vehicle and remote communication device combination, and the like. Also included can be routing guidance 273 and security 274 applications that are adapted to take advantage of a particular vehicle configuration such as positioning devices (GPS, dead reckoning, and the like) car alarm functions, and the like. Telematics functionality module 250 can further include a hands-free application 275 adapted to execute using a particular vehicle/remote communications device combination, such as microphones, number of speakers, displays, and the like. Also, a noise cancellation application 276 can be included to cancel vehicle noise during hands-free operation. Noise cancellation application 276 can be vehicle specific since each vehicle can have its own particular noise signature. Telematics functionality module 250 can further include emergency notification application 278 and other application(s) 279.

The above applications are exemplary and telematics functionality module 250 can include any other telematics related applications and be within the scope of the invention. Also, telematics functionality module 250 does not have to include all or any of the above exemplary embodiments to be within the scope of the invention. For example, telematics functionality module 250 can provide telematics related services such as stolen vehicle tracking, anti-threat notification, roadside assistance, Internet access, email, and the like. In an embodiment, telematics functionality module 250 can be independent from other software modules to allow easy updating for personal customization.

In another embodiment, telematics functionality module 250 can provide access to services to users via telematics enabled remote communications device 208. A service can be an encapsulation of some functionality that is of use to one or more applications (current or anticipated) or that needs to be isolated from the application for some reason. Services also provide a desired functionality of a human user, such as an on-board global positioning system (GPS) device, anti-theft detection, and the like.

Docking apparatus 214 can be coupled to vehicle 209, including a vehicle bus such as a CAN bus, so as to interface with vehicle 209. In an embodiment, communicatively coupling non-telematics enabled remote communications device 206 to docking apparatus 214 can transform non-telematics enabled remote communications device 206 to telematics enabled remote communications device 208. Docking apparatus 214 can include a memory, processor, and the like analogous to that found in remote communications device 106. Communicatively coupling non-telematics enabled remote communications device 206 to docking apparatus 214 in order to create telematics enabled remote communications device 208 can occur through one or more of wireless link 246 or wireline link 248.

In one embodiment, non-telematics enabled remote communications device 206 can detect the presence of docking apparatus 214 and non-telematics enabled remote communications device 206 can initiate communicative coupling to docking apparatus 214. In one embodiment, detecting the presence of docking apparatus 214 can occur, for example, through wireline link 248 between docking apparatus 214 and non-telematics enabled remote communications device 206.

In another embodiment, detecting the presence of docking apparatus 214 can occur by non-telematics enabled remote communications device 206 moving within a zone of influence 210 of docking apparatus 214. In yet another embodiment, detecting the presence of docking apparatus 214 can occur by docking apparatus moving within a zone of influence (not shown for clarity) of non-telematics enabled remote communications device 206. In either embodiment, the zone of influence can be a range where the presence of the other device can be detected and communication established, for example, a communication range, and communication can be established via wireless link 246.

In these embodiment, non-telematics enabled remote communications device 206 initiates communication and permits the downloading and/or enabling of telematics functionality module 250 and transformation to telematics enabled remote communications device 208 once communication is established with docking apparatus 214.

Once communicatively coupled, non-telematics enabled remote communications device 206 and docking apparatus 214 can exchange capability data 220. Capability data 220 can include, but is not limited to, software configuration, hardware configuration, identification data, security data, and the like, of each of docking apparatus 214 and non-telematics enabled remote communications device 206. By exchanging capability data 220 with each other, both docking apparatus 214 and non-telematics enabled remote communications device 206 are then aware of each others capabilities as far as hardware (processor, memory, input device, display, and the like), software (version, level of sophistication, compatibilities, capabilities, and the like). Also, docking apparatus 214 and non-telematics enabled remote communications device 206 can verify each others identity via identity data and security data to ensure both devices are permitted to communicatively couple.

In another embodiment, docking apparatus 214 can detect the presence of non-telematics enabled remote communications device 206 and docking apparatus 214 can initiate communicatively coupling to non-telematics enabled remote communications device 206. In this embodiment, docking apparatus 214 initiates communication and permits the downloading and/or enabling of telematics functionality module 250 to non-telematics enabled remote communications device 206. This allows transformation to telematics enabled remote communications device 208 once communication is established with non-telematics enabled remote communications device 206. Capability data 220 can then be exchanged as described above. Detecting the presence of non-telematics enabled remote communications device 206 can occur via the wireline link 248 and/or the zone of influence and wireless link 246 described above.

In one embodiment, transforming non-telematics enabled remote communications device 206 to telematics enabled remote communications device 208 can comprise rewriting at least a portion of the memory of non-telematics enabled remote communications device 206 to include telematics functionality module 250. In one embodiment, docking apparatus 214 can already contain telematics functionality module 250 configured to operate with the particular vehicle 209. In this embodiment, it is not necessary to download telematics functionality module 250 from download location 129. In this instance, docking apparatus 214 can, for example and without limitation, reflash some or all of the memory of non-telematics enabled remote communications device 206 such that telematics functionality module 250 is included in memory and non-telematics enabled remote communications device 206 is transformed to telematics enabled remote communications device 208. If all of memory is rewritten (for example reflashed), docking apparatus 214 can rewrite the functionality, applications and user information of non-telematics enabled remote communications device 206 to include telematics functionality module 250. This requires that docking apparatus 214 either already have, or have previously downloaded, the functionality, applications and user information for the particular non-telematics enabled remote communications device 206 prior to rewriting the memory of non-telematics enabled remote communications device 206. In this embodiment, the core software of non-telematics enabled remote communications device 206 is rewritten while reinstating any user information and including telematics functionality module 250. This can transform non-telematics enabled remote communications device 206 to telematics enabled remote communications device 208.

In another embodiment, docking apparatus 214 can write only a portion of memory of non-telematics enabled remote communications device 206. For example, docking apparatus 214 can rewrite only a code group within the core code of memory of non-telematics enabled remote communications device 206. This would allow the call processing and boot loader to remain unmodified, but still allow access to an application group of core code to allow the addition of telematics functionality module 250.

In still another embodiment, when non-telematics enabled remote communications device 206 is communicatively coupled to docking apparatus 214, docking apparatus 214 can download telematics functionality module 250 into memory, thereby transforming non-telematics enabled remote communications device 206 into telematics enabled remote communications device 208. Telematics functionality module 250 can be downloaded from download location 129 or docking apparatus 214. When telematics enabled remote communications device 208 is no longer communicatively coupled to docking apparatus 214, telematics functionality module 250 can be removed such that telematics functionality module 250 is no longer available. This can transform telematics enabled remote communications device 208 back to non-telematics enabled remote communications device 206. For example, when communicatively coupled, docking apparatus 214 can load telematics functionality module 250 into RAM on non-telematics enabled remote communications device 206 transforming it to telematics enabled remote communications device 208, and when no longer communicatively coupled, telematics functionality module 250 can be erased from RAM in memory, thereby reversing the transformation.

In yet another embodiment, when non-telematics enabled remote communications device 206 is communicatively coupled to docking apparatus 214, non-telematics enabled remote communications device 206 can be enabled to download telematics functionality module 150, thereby transforming to telematics enabled remote communications device 208. In this embodiment, non-telematics enabled remote communications device 206 does not have telematics functionality module 250 in its memory. As an example of an embodiment, docking apparatus 214 can communicate a VIN 211 or other unique identification number to non-telematics enabled remote communications device 206 such that telematics functionality module 250 compatible with vehicle 209 can be downloaded. In other words, docking apparatus 214 can associate a VIN 211 or other unique identification number to non-telematics enabled remote communications device 206 such that telematics functionality module 250 is compatible with both vehicle 209, thereby transforming non-telematics enabled remote communications device 206 to telematics enabled remote communications device 208.

In yet still another embodiment, when non-telematics enabled remote communications device 206 becomes communicatively coupled to docking apparatus 214, docking apparatus 214 can query non-telematics enabled remote communications device 206 for the presence of telematics functionality module 250. If non-telematics enabled remote communications device 206 does not include a telematics functionality module 250 or does not include a telematics functionality module 250 that is compatible with vehicle 209, then docking apparatus 214 can supply non-telematics enabled remote communications device 206 with a download location 129 to obtain telematics functionality module 250. As an example of an embodiment, docking apparatus 214 can supply a download location in the form of a URL or phone number to non-telematics enabled remote communications device 206 so that a telematics functionality module 250 specific to vehicle 209 can be downloaded, thereby transforming non-telematics enabled remote communications device 206 into telematics enabled remote communications device 208. Docking apparatus 214 can associate VIN 211 or other unique identification number to non-telematics enabled remote communications device 206 for vehicle specific applications. In an embodiment, non-telematics enabled remote communications device 206 can be Java™ or Brew (Binary Runtime Environment for Wireless) enabled.

In another embodiment, non-telematics enabled remote communications device 206 can already have telematics functionality module 250 installed but disabled. When non-telematics enabled remote communications device 206 is communicatively coupled to docking apparatus 214, docking apparatus 214 can enable the (dormant) telematics functionality module 250. For example and without limitation, docking apparatus 214 can change a "bit" or "byte" in memory, such as EEPROM from a "0" to a "1" or visa versa. A specific example of this is flipping a flex bit to enable any one or all of the features of telematics functionality module 250, thereby transforming non-telematics enabled remote communications device 206 to telematics enabled remote communications device 208.

Figure 3:
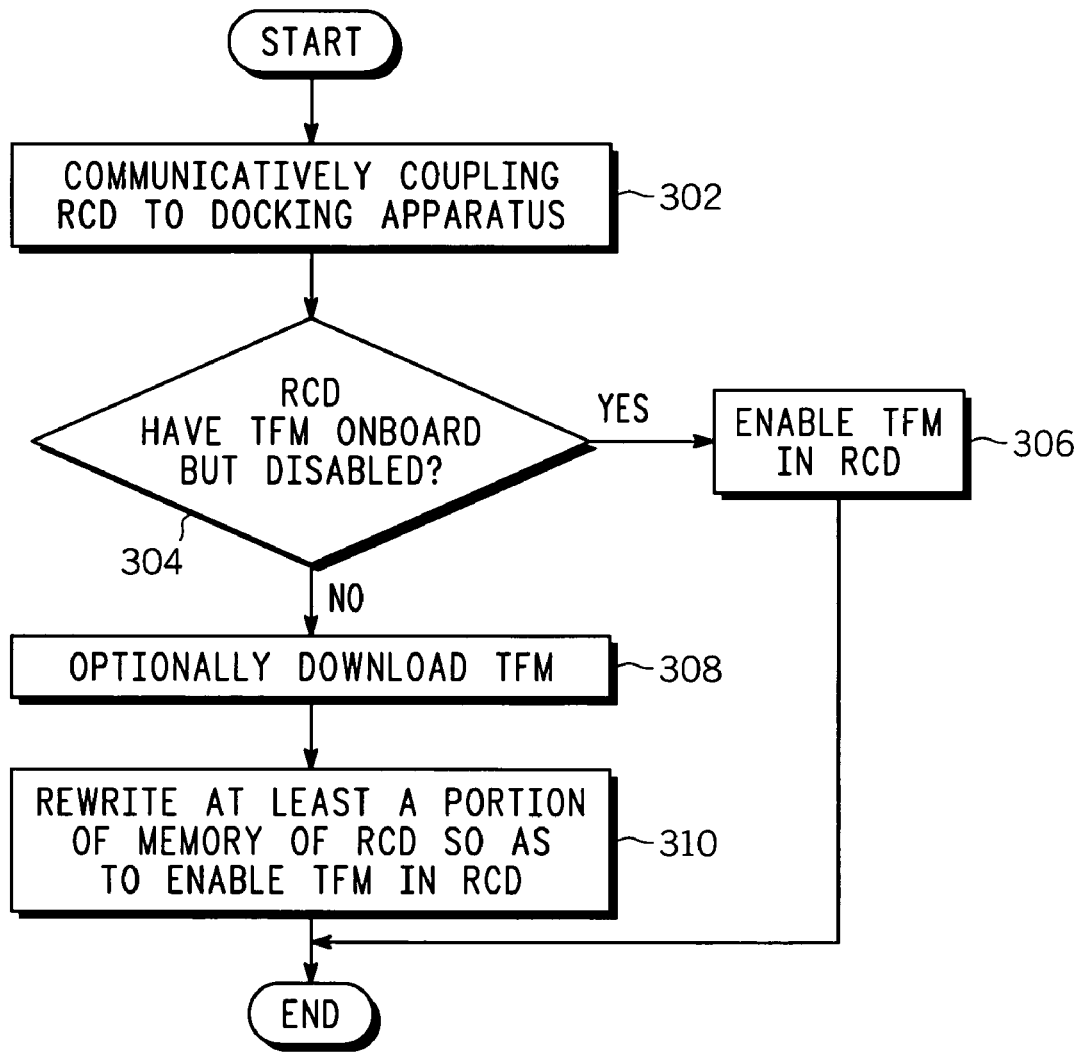
FIG. 3 illustrates a flow diagram of a method of the invention according an embodiment of the invention.

FIG. 3 illustrates a flow diagram 300 of a method of the invention according an embodiment of the invention. In step 302, remote communications device (RCD) is coupled to docking apparatus, where remote communications device is non-enabled with a telematics functionality module (TFM). Communicative coupling can occur via one or more of a wireless link and a wireline link.

In step 304, it is determined if remote communications device already has a telematics functionality module onboard, but the telematics functionality module is disabled. If so, then docking apparatus and remote communications device can enable telematics functionality module per step 306. If not, then telematics functionality module can optionally be downloaded from a download location per step 308. In step 310, at least a portion of memory of remote communications device is rewritten so as to enable telematics functionality module in remote communications device. This has the effect of transforming a non-telematics enabled remote communications device into a telematics enabled remote communications device.

Figure 4:
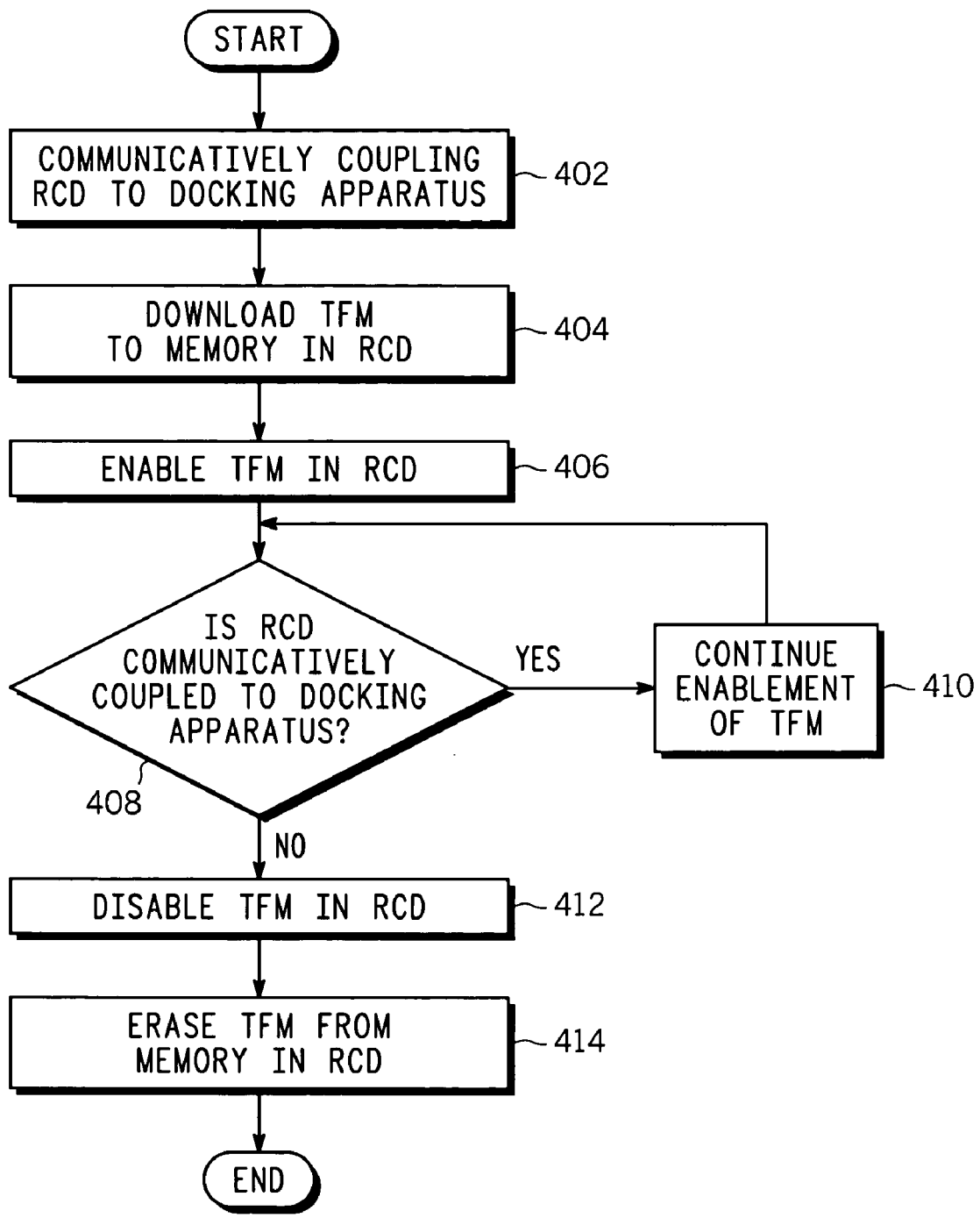
FIG. 4 illustrates a flow diagram of a method of the invention according another embodiment of the invention.

FIG. 4 illustrates a flow diagram 400 of a method of the invention according another embodiment of the invention. In step 402, remote communications device (RCD) is coupled to docking apparatus, where remote communications device is non-enabled with a telematics functionality module (TFM). Communicative coupling can occur via one or more of a wireless link and a wireline link. In step 404, telematics functionality module is downloaded into memory in remote communications device. The telematics functionality module can be downloaded from docking apparatus or a download location. In step 406, telematics functionality module is enabled such that a non-telematics enabled remote communications device is transformed into a telematics enabled remote communications device.

In step 408 it is determined if remote communications device is communicatively coupled to docking apparatus. If so, remote communications node continues to be enabled with telematics functionality module per step 410. If not, telematics functionality module is disabled in remote communications device per step 412 and erased or otherwise removed from memory of remote communications node per step 414. This transforms telematics enabled remote communications device back to non-telematics enabled remote communications device.

Figure 5:
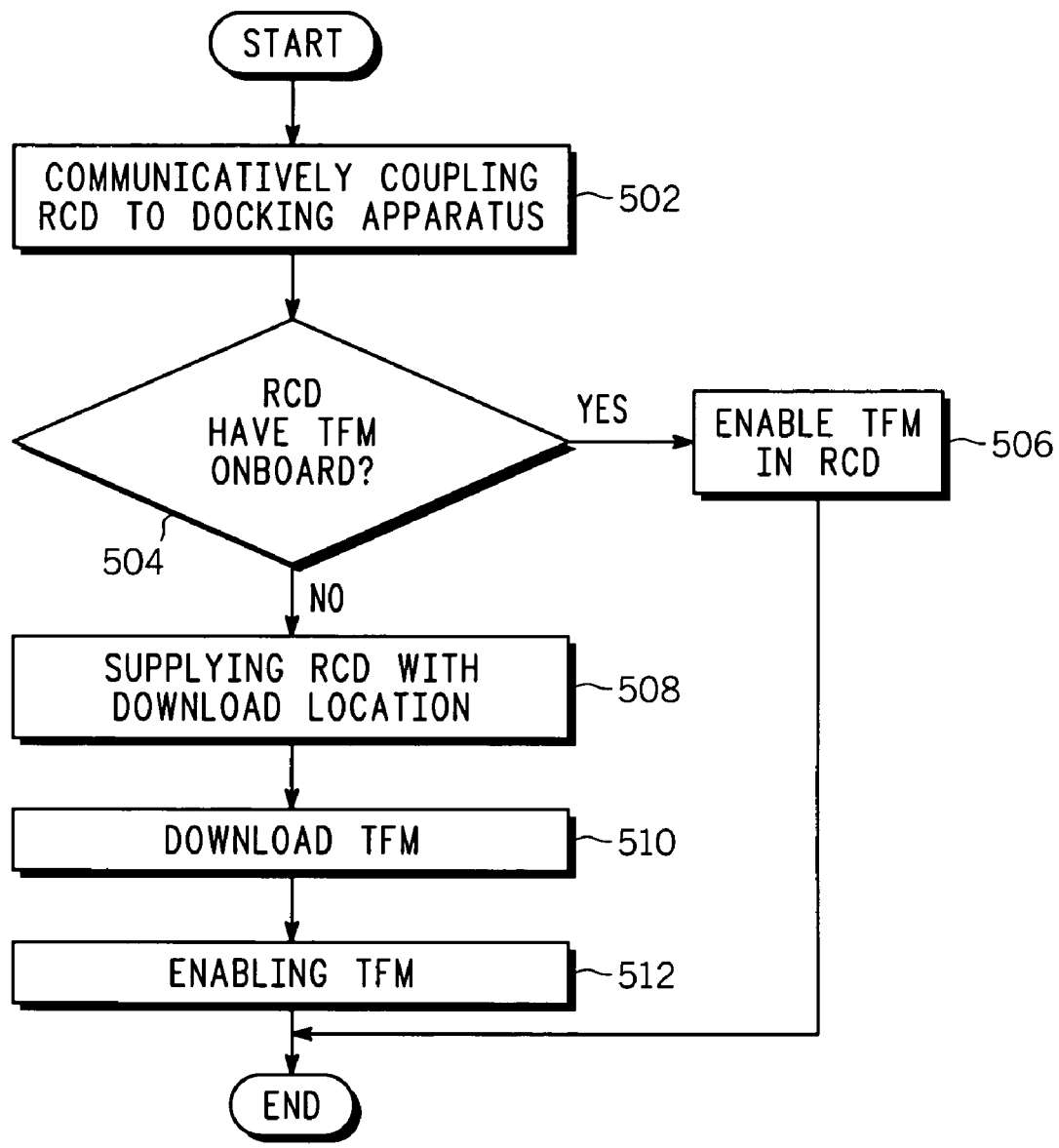
FIG. 5 illustrates a flow diagram of a method of the invention according yet another embodiment of the invention.

FIG. 5 illustrates a flow diagram 500 of a method of the invention according yet another embodiment of the invention. In step 502, remote communications device (RCD) is coupled to docking apparatus, where remote communications device is non-enabled with a telematics functionality module (TFM). Communicative coupling can occur via one or more of a wireless link and a wireline link. In step 504 it is determined if remote communications device has telematics functionality module onboard already but disabled. If so, then the telematics functionality module is enabled per step 506, transforming non-telematics enabled remote communications device into telematics enabled remote communications device. If not, remote communications device can be supplied with a download location where telematics functionality module can be obtained per step 508. Download location can be supplied, for example, by docking apparatus. In an embodiment, and not limiting of the invention, download location can be a URL address or a phone number.

In step 510, telematics functionality module can be downloaded to remote communications device. In step 512, telematics functionality module can be enabled, thereby transforming non-telematics enabled remote communications device into telematics enabled remote communications device.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:

1. A method, comprising:
providing a docking apparatus coupled to interface with a vehicle;
communicatively coupling a remote communications device to the docking apparatus, wherein the remote communications device does not include a telematics functionality module; and
the docking apparatus communicating with the remote communications device to include the telematics functionality module in a memory of the remote communications device, including: (i) the docking apparatus downloading the telematics functionality module into the memory of the remote communications device, or (ii) the docking apparatus supplying the remote communications device with a download location to download the telematics functionality module into the memory from the download location, wherein the telematics functionality module provides telematics functionality that is specific to the vehicle and that is based on vehicle-identification information that the docking apparatus associates to the remote communication device;
wherein the docking apparatus communicating with the remote communications device to include the telematics functionality module in the memory of the remote communications device, further includes: the docking apparatus querying the remote communications device regarding the presence of the telematics functionality module and determining that a telematics functionality module that is compatible with the vehicle is not present in the remote communications device.

2. The method of claim 1, wherein the telematics functionality module comprises one or more telematics related applications including at least one of a personal telematics application, a security application, a hands-free application, and an air bag system notification application.

3. The method of claim 2, wherein the hands-free application is specific to the vehicle.

4. The method of claim 3,
wherein the hands-free application uses a noise-cancellation application that is configured to cancel vehicle noise during hands-free operation, wherein the noise-cancellation application is specific to a noise signature of the vehicle.

5. The method of claim 1, wherein the docking apparatus is a car kit.

6. The method of claim 1, wherein communicatively coupling comprises communicatively coupling using at least one of a wireless link and a wireline link.

7. The method of claim 1, further comprising:
the remote communications device detecting the docking apparatus; and
the docking apparatus and the remote communications device exchanging capability data.

8. The method of claim 7, wherein the capability data comprises at least one of a software configuration, a hardware configuration, identification data and security data.

9. The method of claim 1, further comprising:
the docking apparatus detecting the remote communications device; and
the docking apparatus and the remote communications device exchanging capability data.

10. The method of claim 9, wherein the capability data comprises at least one of a software configuration, a hardware configuration, identification data and security data.

11. The method of claim 1, wherein the docking apparatus downloading the telematics functionality module into the memory of the remote communications device comprises the docking apparatus rewriting at least a portion of the memory of the remote communications device to include the telematics functionality module.

12. The method of claim 1, further comprising:
erasing the telematics functionality module from the memory of the remote communications device when the remote communications device ceases being communicatively coupled to the docking apparatus.

13. The method of claim 1, wherein the docking apparatus supplying the remote communications device with a download location to download the telematics functionality module into the memory from the download location comprises:

the remote communications device downloading the telematics functionality module into the memory from the download location supplied by the docking apparatus.

14. The method of claim 1, wherein the telematics functionality that is specific to the vehicle includes at least one of: door unlocking, remote access, and remote start.

15. A docking apparatus coupled to interface with a vehicle, the docking apparatus comprising:

a processor; and a computer-readable medium containing computer instructions for execution by the processor, the computer instructions comprising instructions (i) configured to communicatively couple a remote communications device to the docking apparatus, wherein the remote communications device does not include a telematics functionality module and (ii) configured to cause the docking apparatus to communicate with the remote communications device to include the telematics functionality module in a memory of the remote communications device, including: (i) the docking apparatus downloading the telematics functionality module into the memory of the remote communications device, or (ii) the docking apparatus supplying the remote communications device with a download location to download the telematics functionality module into the memory from the download location, wherein the telematics functionality module provides telematics functionality that is specific to the vehicle and that is based on vehicle-identification information that the docking apparatus associates to the remote communication device;

wherein the instructions configured to cause the docking apparatus to communicate with the remote communications device to include the telematics functionality module in the memory of the remote communications device further comprise: instructions configured to cause the docking apparatus to query the remote communications device regarding the presence of the telematics functionality module and to determine that a telematics functionality module that is compatible with the vehicle is not present in the remote communications device.

16. The docking apparatus of claim 15, wherein the telematics functionality module comprises one or more telematics related applications including at least one of a personal telematics application, a security application, a hands-free application, and an air bag system notification application.

17. The docking apparatus of claim 16, wherein the hands-free application is specific to the vehicle.

18. The docking apparatus of claim 17, wherein the hands-free application uses a noise-cancellation application that is configured to cancel vehicle noise during hands-free operation, wherein the noise-cancellation application is specific to a noise signature of the vehicle.

19. The docking apparatus of claim 15, wherein the docking apparatus is a car kit.

20. The docking apparatus of claim 15, wherein communicatively coupling comprises communicatively coupling through at least one of a wireless link and a wireline link.

21. The docking apparatus of claim 15, wherein the computer instructions further comprise instructions for the docking apparatus exchanging capability data with the remote communications device when the remote communications device detects the docking apparatus.

22. The docking apparatus of claim 21, wherein the capability data comprises at least one of a software configuration, a hardware configuration, identification data and security data.

23. The docking apparatus of claim 15, wherein the computer instructions further comprise instructions for the docking apparatus detecting the remote communications device and for the docking apparatus exchanging capability data with the remote communications device.

24. The docking apparatus of claim 23, wherein the capability data comprises at least one of a software configuration, a hardware configuration, identification data and security data.

25. The docking apparatus of claim 15, wherein the instructions for the docking apparatus downloading the telematics functionality module into the memory of the remote communications device comprise instructions for the docking apparatus rewriting at least a portion of the memory of the remote communications device to include the telematics functionality module.

26. The docking apparatus of claim 15, wherein the telematics functionality that is specific to the vehicle includes at least one of: door unlocking, remote access, and remote start.

* * * * *